US012153785B2

(12) United States Patent
Klein et al.

(10) Patent No.: US 12,153,785 B2
(45) Date of Patent: Nov. 26, 2024

(54) MULTI-CRITERIA OPTION COMPARISON TOOL

(71) Applicant: The MITRE Corporation, McLean, VA (US)

(72) Inventors: Gary Lee Klein, Reston, VA (US); Brittany Allison Tracy, Garden City, GA (US); Elizabeth Haines, Bellingham, MA (US); Thomas W. Whieldon, Roy, WA (US); Christopher M. Berger, Lowell, MA (US); Gavin Timothy Plesko, Melrose, MA (US); Mark Stephen Pfaff, Woburn, MA (US)

(73) Assignee: The MITRE Corporation, McLean, VA (US)

( * ) Notice: Subject to any disclaimer, the term of this patent is extended or adjusted under 35 U.S.C. 154(b) by 119 days.

(21) Appl. No.: 17/869,402

(22) Filed: Jul. 20, 2022

(65) Prior Publication Data

US 2024/0028187 A1    Jan. 25, 2024

(51) Int. Cl.
*G06F 3/04847* (2022.01)
*G06F 16/26* (2019.01)

(52) U.S. Cl.
CPC .......... *G06F 3/04847* (2013.01); *G06F 16/26* (2019.01)

(58) Field of Classification Search
CPC .......................... G06F 3/04847; G06F 16/26
See application file for complete search history.

(56) References Cited

U.S. PATENT DOCUMENTS 7,836,057 B1 * 11/2010 Micaelian ........... G06F 16/9535
707/750
11,533,242 B1 * 12/2022 Nesteroff ................ G06F 9/453

* cited by examiner

*Primary Examiner* — Andrey Belousov
(74) *Attorney, Agent, or Firm* — Morrison & Foerster LLP

(57) ABSTRACT

Disclosed herein is a computer-implemented method comprising: aggregating option evaluation data for a plurality of options and for a plurality of predefined criteria; graphically displaying the user modifiable chart comprising the plurality of graphical representations of the aggregated option evaluation data, wherein: each graphical representation depicts data points visually plotted with weights, the plurality of graphical representations for the plurality of predefined criteria are visually ordered according to a rank of the plurality of predefined criteria, and the weights are based on the rank of the plurality of predefined criteria; detecting a first user input modifying the rank of at least one predefined criterion; in accordance with the first user input, automatically updating the weights of the data points; and displaying an updated user modifiable chart comprising the plurality of graphical representations of the aggregated option evaluation data.

23 Claims, 8 Drawing Sheets

MULTI-CRITERIA OPTION COMPARISON TOOL

FIELD OF THE DISCLOSURE

This disclosure relates generally to computer implemented decision-making tools, and more specifically to decision-making tools for comparing multiple options based on multiple criteria.

BACKGROUND OF THE DISCLOSURE

When a decision maker is faced with considering many options, each option better or worse than the next according to many different criteria, it often becomes challenging to assess the tradeoffs associated with each of the options equally and in detail. The decision maker may employ visualizations in the form of comparison tables or stoplight charts, or attempt to contemplate the options and multiple criteria in their mind. Stoplight charts fall short in allowing the decision maker to understand the complete range of possible outcomes and are not customizable according to the decision maker's needs and values. Likewise, comparison tables in general tend to be static, non-customizable, lengthy, unwieldy, and require verbal rather than non-verbal cognitive resources.

In the absence of comparison tables, a decision maker is forced to consider all of the options using their mind, generally considering one option and a small number of criteria at a time. This serial process requires the person to remember each option's performance on each criteria, apply mental transformations based on their needs and values, and make updates to the performances when information changes. Additionally, inherent properties, such as uncertainty, unpredictability, and interdependency, can exceed the experience and cognitive abilities of human decision makers. Thus, considering many options using oversimplified and non-interactive visualizations is prone to bias and error, leading to poor decision-making and negative impacts in the domain/industry the decision applies to. Therefore, a need exists for a computerized multi-criteria option comparison and visualization tool to support parallel comparison of multiple competing options over multiple criteria to increase users' awareness of their options and their potential outcomes.

SUMMARY OF THE DISCLOSURE

The disclosed multi-criteria option comparison tool supports complex decision-making by providing an interactive way for users to visually compare tradeoffs between many options in parallel according to a set of evaluation criteria. The visualization tool links options and evaluation criteria, allows for customization of criteria importance and satisfactory performance, includes frequency distributions to display ranges and clusters of outcomes (rather than oversimplified point estimates), and exposes individual data points to support intuitive and relatable case-based understanding. The multi-criteria option comparison tool has applications in a variety of industries/domains, such as water quality management, military logistics, medical treatment choices, and emergency response.

In some embodiments, a computer-implemented method for displaying a user modifiable chart comprising a plurality of graphical representations of aggregated option evaluation data is provided, the method comprising: aggregating option evaluation data for a plurality of options and for a plurality of predefined criteria; graphically displaying the user modifiable chart comprising the plurality of graphical representations of the aggregated option evaluation data, wherein: each graphical representation depicts data points visually plotted with weights, the plurality of graphical representations for the plurality of predefined criteria are visually ordered according to a rank of the plurality of predefined criteria, and the weights are based on the rank of the plurality of predefined criteria; detecting a first user input modifying the rank of at least one predefined criterion; in accordance with the first user input, automatically updating the weights of the data points; and displaying an updated user modifiable chart comprising the plurality of graphical representations of the aggregated option evaluation data.

In some embodiments, the method includes, in accordance with the first user input, automatically updating the visual order of the plurality of graphical representations for the plurality of predefined criteria.

In some embodiments, the method includes displaying the updated user modifiable chart comprising the updated visual order of the plurality of graphical representations for the plurality of predefined criteria.

In some embodiments, each graphical representation for the plurality of predefined criteria comprises a user modifiable satisfaction threshold.

In some embodiments, the user modifiable satisfaction thresholds distinguish between more desirable and less desirable plotted data points.

In some embodiments, the method includes detecting a second user input modifying the satisfaction threshold of at least one graphical representation.

In some embodiments, the method includes, in accordance with the second user input, automatically updating a location of a marker and a colored shading on the plurality of graphical representations.

In some embodiments, the method includes displaying the updated user modifiable chart comprising the updated marker and the updated colored shading on the plurality of graphical representations.

In some embodiments, the colored shading in a first direction from the marker is a first color, and the colored shading in a second direction from the marker is a second color.

In some embodiments, the user modifiable chart is utilized to evaluate a plurality of plans of action to achieve an objective.

In some embodiments, the plurality of options includes alternative military courses of action.

In some embodiments, the plurality of predefined criteria for evaluating the military courses of action includes survivability, capacity, flexibility, and synchronization.

In some embodiments, each graphical representation depicts the data points in one or more frequency distributions on a vertical axis.

In some embodiments, a data point represents an individual outcome contributing to one or more options being evaluated.

In some embodiments, a location of the data point on a graphical representation of the aggregated option evaluation data is based on performance of the individual outcome.

In some embodiments, a first direction of the plurality of graphical representations depicts better performance, and a second direction of the plurality of graphical representations depicts worse performance.

In some embodiments, the performance is normalized for comparing the plurality of options based the plurality of predefined criteria.

In some embodiments, a first graphical representation of the aggregated option evaluation data comprises a first set of data points related to a first option.

In some embodiments, a second graphical representation of the aggregated option evaluation data comprises a second set of data points evaluated based on a first predefined criterion.

In some embodiments, a portion of the second set of data points overlaps with the first set of data points.

In some embodiments, a format of the plurality of graphical representations is interchangeable between frequency distributions and individual data points based on user selection.

In some embodiments, a system for displaying a user modifiable chart comprising a plurality of graphical representations of aggregated option evaluation data is provided, the system comprising: a display; and one or more processors configured to cause the system to: aggregate option evaluation data for a plurality of options and for a plurality of predefined criteria; graphically display the user modifiable chart comprising the plurality of graphical representations of the aggregated option evaluation data, wherein: each graphical representation depicts data points visually plotted with weights, the plurality of graphical representations for the plurality of predefined criteria are visually ordered according to a rank of the plurality of predefined criteria, and the weights are based on the rank of the plurality of predefined criteria; detect a first user input modifying the rank of at least one predefined criterion; in accordance with the first user input, automatically update the weights of the data points; and display an updated user modifiable chart comprising the plurality of graphical representations of the aggregated option evaluation data.

In some embodiments, a non-transitory computer-readable storage medium storing instructions for displaying a user modifiable chart comprising a plurality of graphical representations of aggregated option evaluation data is provided, the instructions executable by a system, the system comprising a display and one or more processors, wherein execution of the instructions by the system causes the system to: aggregate option evaluation data for a plurality of options and for a plurality of predefined criteria; graphically display the user modifiable chart comprising the plurality of graphical representations of the aggregated option evaluation data, wherein: each graphical representation depicts data points visually plotted with weights, the plurality of graphical representations for the plurality of predefined criteria are visually ordered according to a rank of the plurality of predefined criteria, and the weights are based on the rank of the plurality of predefined criteria; detect a first user input modifying the rank of at least one predefined criterion; in accordance with the first user input, automatically update the weights of the data points; and display an updated user modifiable chart comprising the plurality of graphical representations of the aggregated option evaluation data.

BRIEF DESCRIPTION OF FIGURES

The invention will now be described, by way of example only, with reference to the accompanying drawings, in which.

DETAILED DESCRIPTION OF THE DISCLOSURE

Figure 1A:
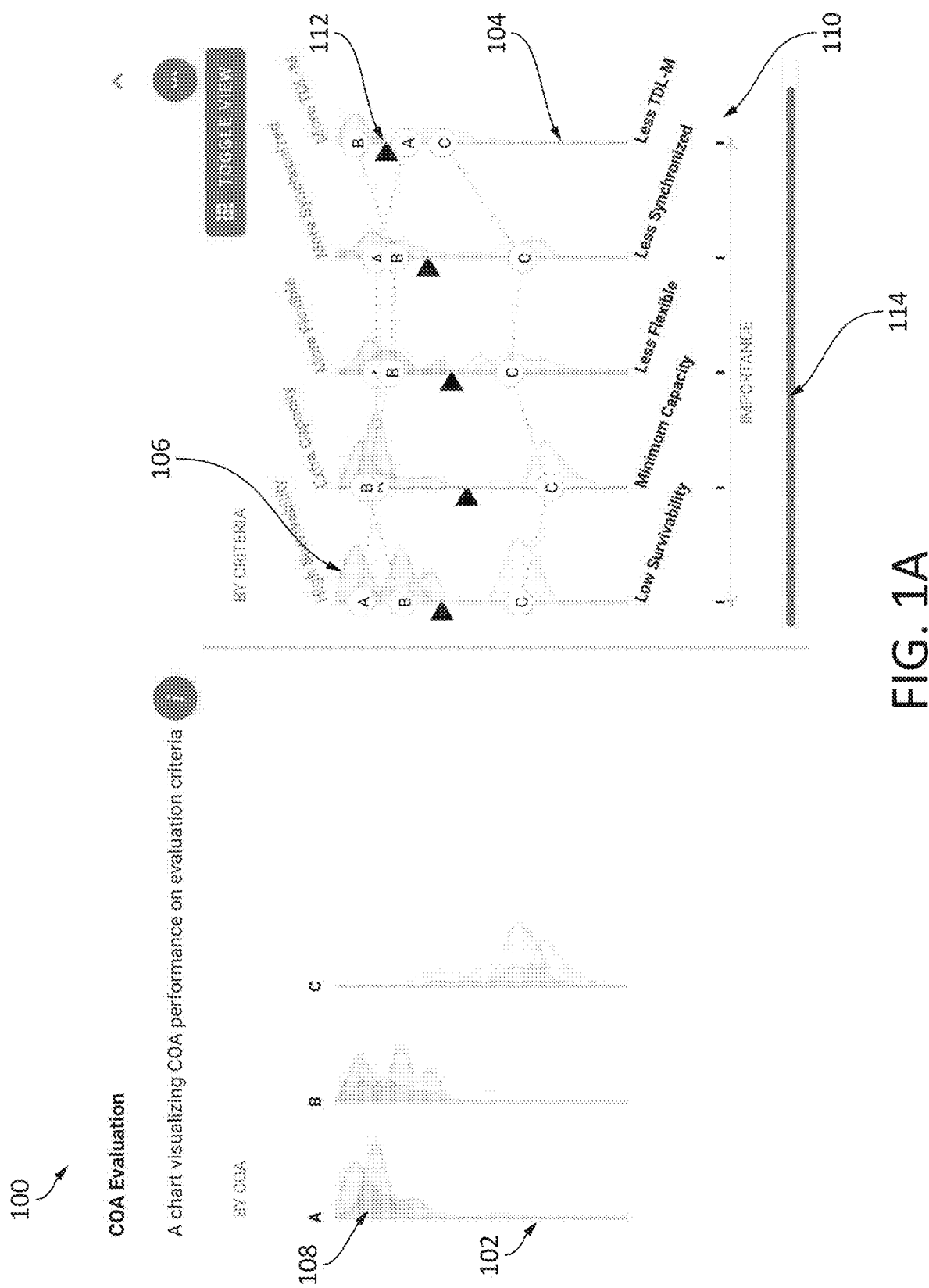
FIGS. 1A-1F illustrate user interfaces of a multi-criteria option comparison tool, in accordance with some embodiments.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

The disclosed multi-criteria option comparison tool may be used to support complex decision-making comprising many options and evaluation criteria. The tool may aggregate data from different sources to form a set of predefined options and criteria, and may dynamically adjust based on the rank and satisfaction threshold of each criteria selected by a decision maker. With the visualization tool, the user can compare tradeoffs across multiple options, over multiple criteria, each in parallel, and depict one or more suitable options for solving a problem.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The present disclosure in some embodiments relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

FIGS. 1A-1F illustrate user interface 100 of a multi-criteria option comparison tool for depicting one or more suitable options from a plurality of options using multiple criteria, which will be described in greater detail below. Data used in the multi-criteria option comparison tool may be derived from exploratory modeling or historic case-based data stored in a data file, according to some embodiments. Exploratory modeling is described as using computational experiments to analyze complex and uncertain issues. Shown in FIG. 1A, the data aggregated in the visualization tool may be based on a plurality of predefined options, illustrated by the letters "A", "B", and "C" in FIGS. 1A-1F. Each option may correspond with a graphical representation 102 in the display. In some embodiments, options may comprise a plurality of solutions for solving a problem (e.g., alternative water treatment technologies with different advantages and disadvantages of varying levels of confidence), or a plurality of plans of action to achieve an objective (e.g., alternative military courses of action or alternative medical treatments for cancer), or different levels of response (e.g., the number of firetrucks to send to a fire).

Additionally, data used in the multi-criteria comparison model may be aggregated by a plurality of predefined evaluation criteria used to analyze each option. Each evaluation criterion may have a graphical representation 104 in user interface 100. The evaluation criteria may be used to differentiate better options from worse ones. In some embodiments, evaluation criteria may distinguish different characteristics of alternative solutions, alternative policies or plans, or different levels of response. For example, in the water treatment application of the model, evaluation criteria may include efficacy, volume, waste, and cost, with varying levels of confidence. In embodiments where evaluation criteria may distinguish alternative policies or plans, such as in the military example, evaluation criteria may include factors like survivability, capacity, flexibility, and synchronization, over varying levels of uncertainty. Additionally, in the instance evaluation criteria are applied to distinguish between different levels of response (e.g., in the emergency response example), evaluation criteria may include the efficacy of a given level of fire trucks in putting out a fire, the damage and lives saved, the opportunity loss of reducing remaining resources to fight other fires, and the operational cost of supplying fire trucks. The set of predefined options and criteria are customizable for each application of the multi-criteria option comparison tool and are not limited to those provided as examples above.

Each of the option graphs 102 and criterion graphs 104 may include a plurality of outcomes, represented as distributions. The distributions may be aggregated according to options (e.g., distributions 108) and criteria (e.g., distributions 106). Thus, distributions 106 represent substantially the same set of data as distributions 108, but are grouped in a different manner. The system may analyze case-based data related to individual outcomes to generate the plurality of distributions.

The set of options may be illustrated in parallel in the form of option graphical representations 102, such as layered density plots, as shown in the left data pane of user interface 100. Each plot may comprise a vertical or horizontal axis with a layered set of distributions 108 which correlates with the distributions 106 of the criteria graphical representations 104. For example, as shown in FIG. 1B, each of the distribution 106 related to option C for the criteria survivability, capacity, flexibility, and synchronization in the right data pane may contribute to the layered distributions 108 on the option graph 102 of option C, shown in the left data pane.

In some embodiments, user interface 100 may include scale 110 for illustrating a rank of the evaluation criteria. The criteria may be manually ranked by the decision maker relative to one another according to their importance as perceived by the decision maker. In some embodiments, the evaluation criteria may be ranked according to a different attribute, such as the priorities of relevant stakeholders, and the decision maker may modify the attribute during use of the multi-criteria option comparison tool. The criteria may be visually ordered by decreasing importance from left-to-right or top-to-bottom on the user interface 100, for example. Ranking the set of evaluation criteria will be described in greater detail below with respect to FIG. 1D. Based on the assigned rank and/or importance value, the visual weight applied to the individual data points making up the distributions in the right and left data panes may automatically scale in proportion to the criteria's importance (as opposed to considering all criteria equally). The scaling may affect the kurtosis (i.e., height) of the distributions 106 and 108 (as opposed to the distribution base, such as to not misrepresent the data).

Figure 1B:
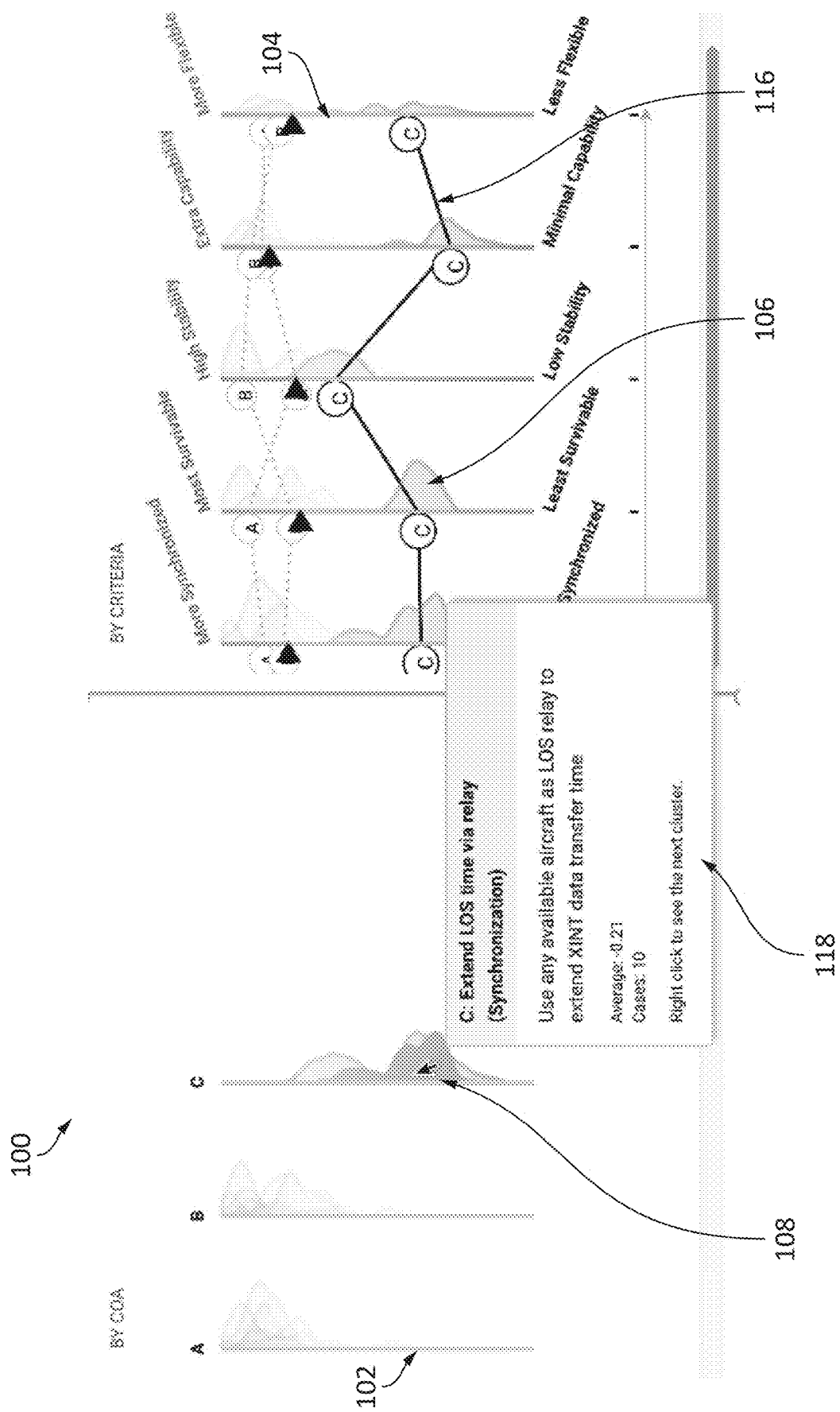

In the right data pane of user interface 100 in FIG. 1A, the user may visualize how each option performs according to the desired evaluation criteria. The individual performance of each data point may be represented in a graph, such as a parallel density plot, wherein each distribution 106 is made up of one or more data points describing the distribution of historical or potential future outcomes related to a single criterion and is layered on a vertical or horizontal axis. For example, the performance of options A, B, and C as it relates to the criterion survivability are illustrated on a graph 104 corresponding to survivability, and each distribution 106 may be distinguished with a label or icon depicting the correlating option, as will be described in greater detail below. The distributions 106 and 108 are frequency distributions demonstrated as density plots on the option graph 102 and criteria graph 104, rather than point estimates of a single value or probability, which oversimplify the data by obscuring the diversity of potential outcomes. Each set of distributions may have one or more modes, illustrating a higher frequency of outcomes at a given location on the axis of graphical representations 102 and 104. The use of frequency distributions (rather than point estimates) may allow the user to view one or more clusters of outcomes and may cue the user to investigate what causes different options to perform differently under different circumstances.

In some embodiments, one or more distributions may visually overlap on an axis. The distributions 106 and 108 may be differentiated in the graphs by defining the boundaries of each distribution. Each distribution may be shaded, as will be described in greater detail below. In the instance two or more distributions overlap on an axis, partial transparency at the overlap may reveal the portion of overlap between the two or more distributions.

The multi-criteria option comparison tool may illustrate options on a generic scale of, for example, good and bad, better and worse, or more desirable and less desirable criteria values, as opposed to absolute units. The customizable threshold for satisfactory and unsatisfactory values is described in greater detail below. For example, one direction (e.g., the top end or left end) of the graphical representations 102 and 104 for each option and evaluation criteria may designate more desirable outcomes, and the opposite direction (e.g., the bottom or right end) of the graphical representations 102 and 104 may designate less desirable outcomes. For example, for the criteria stability, one end of the axis may correlate with high stability (more desirable), and the opposing end of the axis may correlate with low stability (less desirable). The inputted data may be normalized to equate with this scale, making the different criteria commensurate in scale, and allowing the decision maker to easily compare between different evaluation criteria. For example, all analyses of individual outcomes may be normalized to a scale of 1 to −1, or 0 to 1.

Each criteria graph 104 may comprise a moveable marker 112 to indicate a satisfaction threshold. Marker 112 may be, for example, a triangle, rectangle, circle, or line on an axis of the graph. The threshold may be initially set (e.g., by default in the system) to the median of the outcomes evaluated for each criteria, such that 50% of the outcomes are above the threshold, and 50% are below. The user may customize the perceived threshold of satisfaction using marker 112 on the axis of each graph 104 based on their preferences and/or needs. For example, if any amount of survivability is acceptable to a decision maker, the decision maker may move marker 112 on the criteria axis associated with survivability to the bottom of the axis, thus depicting all outcomes on the survivability axis as acceptable. On the other hand, if a decision maker has a small threshold of satisfaction for a given criteria, the decision maker may move marker 112 up along the given axis. In some embodiments, the user may manually input a normalized value (e.g., between 0 and 1, or −1 and 1) corresponding to a position on the axis, and the position of marker 112 on the axis may update accordingly. For example, the user may input "0," and the marker location may update to the middle of a given axis.

In some embodiments, an acceptable outcome (i.e., in one direction from marker 112) may be indicated by a first color of shading (e.g., green) on the distribution 106, and an unacceptable outcome (i.e., in the opposing direction from marker 112) may be indicated by a second color of shading (e.g., red) on the distribution of 106. Other combinations of colors and/or patterns may be employed to differentiate between perceived satisfactory and unsatisfactory outcomes contributing to distributions 106 and 108. In some embodiments, when a user modifies the position of marker 112 on one or more graphical representations 104 via one or more methods described above, the shading of distributions 106 and 108 may update accordingly. The pattern and/or shading from distributions 106 may directly translate to that illustrated on distributions 108, despite option graphs 102 not comprising marker 112, in some embodiments.

Shown in FIG. 1A, the multi-criteria option comparison tool may by default automatically sort the options in the left data pane of the interface 100 according to robustness. For example, graphs 102 associated with each option may be ordered by decreasing robustness from left-to-right, top-to-bottom, etc. How robust an option is may be based at least on the range of possible outcomes that the option turns out satisfactorily (i.e., acceptably) for. For example, option A in FIG. 1A is more robust than options B and C at least because option A performs satisfactorily for the largest range of evaluation criteria and little to no distributions of outcomes for option A are deemed unsatisfactory. Therefore, one may conclude option A is a more suitable option compared to options B and C based on the evaluation criteria provided in the right data pane. The robustness of an option may be more valuable than optimality for a decision maker because the more optimal option may only be considered the "best" solution under specific conditions, which may not always be guaranteed. By displaying more robust options first, decision makers are instantly provided with the best options according to the default rank of evaluation criteria, thereby requiring minimum intervention and/or configuration by the decision maker to make a quick decision between options.

In some embodiments, a user may order option graphs 102 in any fashion described above with respect to criteria graphs 104 in FIG. 1A above and FIG. 1D below. For example, a user may manually adjust the visual order of graphs 102 such that the options the decision maker is most interested in are viewed first. In some embodiments, the user may modify the order of graphs by selecting (e.g., clicking with a user input device, touching on a touch screen, etc.) one or more graphs 102, dragging the graph to a desired location, and dropping the graph. In some embodiments, a decision maker may modify the order of option graphs 102 by manually inputting the title of one or more options into interface 100 to indicate a desired order of graphs 102.

In some embodiments, the decision maker may desire a deeper investigation beyond observing options according to robustness and may look to the criteria graphs 104. The visualization tool may initially automatically sort evaluation criteria graphs 104 in descending order (e.g., from left-to-right or top-to-bottom) by variance (e.g., influence) in the right pane of user interface 100. Evaluation criteria with the most variation may be understood to provide the most value in differentiating between options and thus are more influential to the decision maker than criteria which provide little or no variation between options. For example, as shown in FIG. 1A, options A, B, and C are located nearest one another on graph 104 representing the criterion "TDL-M," thus the TDL-M criterion is initially visually ranked after the other criteria. Thus, the performance of each option with regards to the TDL-M criterion may have the least weight to contribute to distributions 106 and TDL-M associated distributions 108. In some embodiments, the user may manually order the evaluation criteria graphs 104 as described above with respect to option graphs 102. For example, the user may order the criteria graphs 104 with respect to a user-perceived importance of each criteria. In the instance where many options and criteria are being considered with the visualization tool, the decision maker may utilize scroll bars 114 on interface 100 to view less robust options and criteria with less variability. Scroll bars 114 may be located along a side of each data pane, such as the top, bottom, middle, left, or right.

Figure 1C:
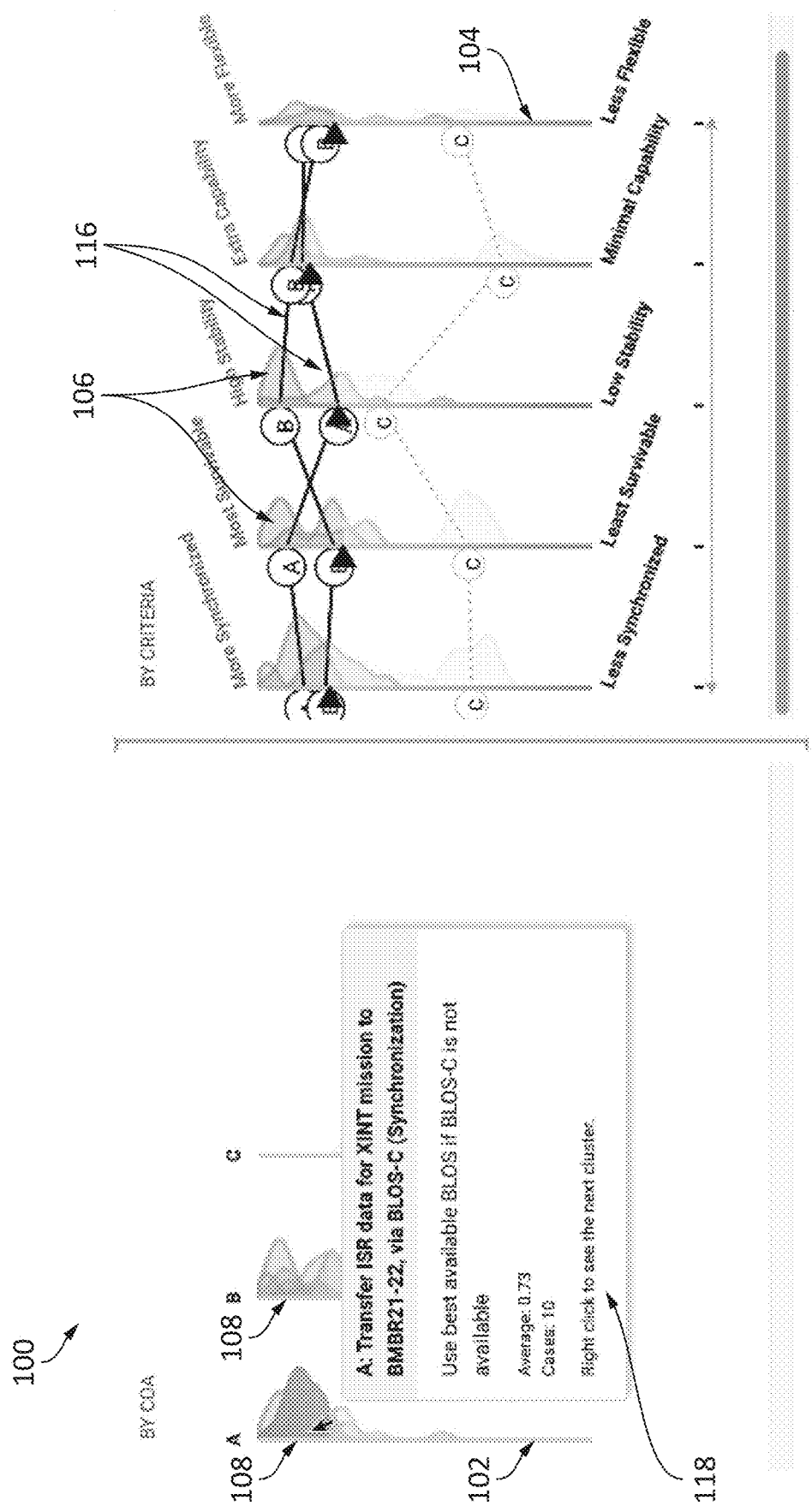

With reference to FIGS. 1B-1C, a decision maker may select one or more option graphs 102 in the left data pane, and the option graph as well as the corresponding selection may be visually highlighted in real-time across criteria graphs 104 in the right data pane. For example, a user may click on, touch, or hover a cursor on the display over any one or more features of the corresponding option graph 102 to highlight one or more features. In some embodiments, the user may manually input the desired options to interface 100, or select one or more options to highlight from a list on the interface. In some embodiments, the remaining non-selected graphs 102 and distributions 106 on criteria graphs 104 may be dimmed, such as to recede them from the user's view, but not completely remove them from sight. For example, the coloring of each non-selected option graph 102 and/or unrelated distribution 106 may be dimmed in comparison to the selected graphs and related distributions. Likewise, a decision maker may select one or more criteria graphs 104 in the right data pane, and the corresponding distributions 108 in the left data pane on option graphs 102 may be visually highlighted. The non-selected distributions 108 and/or criteria graphs 104 may be receded from the user's view, such as by automatically dimming the graphs/distributions.

As shown in FIG. 1B, the decision maker may select (e.g., via one or more methods described above) the option C graph 102 on the interface 100, and each of the corresponding distributions 106 in the criteria graphs 104 may be highlighted in real-time in the right data pane. Likewise, in FIG. 1C, the decision maker may select more than one option graph 102, such as graphs A and B as shown, and the corresponding distributions 106 in the right data pane for both options may be instantly highlighted. In each of FIGS. 1B and 1C, the unselected distributions 106 and option graphical representations 102 may be recessed from the user's view.

In some embodiments, each distribution 106 across the criteria graphs 104 is identified with an icon 116 for the corresponding option. The icon may be positioned at the median of the outcomes contributing to a given distribution, and each icon 116 for a given option may be visually connected across the criteria graphs 104. For example, similar to a parallel coordinates or parallel categories plot, icons 116 may be connected via one or more lines between graphs 104. The lines may be solid, dashed, broken lines, etc. In relation to the selected one or more option graphs 102, the icons 116 corresponding to the highlighted distributions 106 may additionally be accentuated in comparison to the remaining icons in the right data pane, as shown. In some embodiments, the lines connecting each highlighted distribution 106 across different graphs 104 may be bolded and intensified in color upon selecting a corresponding distribution. Accentuating the lines and/or icons 116 associated with one or more selected options 102 may enable a simple visual comparison between options for the decision maker.

In moving a pointer (e.g., with a mouse) over option graphs 102 or criteria graphs 104, the decision maker may also visualize tooltip 118, which may provide information related to the corresponding criteria for that option. A user may view tooltip 118 by, for example, by clicking on and/or hovering a cursor over a desired graph. Tooltip 118 may detail the number of individual outcomes grouped within the corresponding option, an explanation of the option, etc. In some embodiments, the user may click on or hover over a given distribution in a graphical representation 102 or 104, and data related to the given distribution may be presented on the interface 100. For example, a user may view information such as the number of outcomes contributing to the distribution, the normalized average for the cluster of outcomes, a textual summary of the distribution of outcomes, etc. In some embodiments, a user may initially click a first distribution on a graph 102 and/or 104 and may then scroll or click again (i.e., right click or left click on a user input device, such as a mouse) to view information related to subsequent distributions 106 and/or 108 on the graph. For example, as described above, one or more distributions on a given axis of a graph 102 and/or 104 may be layered such that a second distribution is at least partially hidden behind a first distribution. Thus, by selecting a first distribution on a given graph, the user may easily toggle between viewing information for each subsequent distribution on tooltip 118. In some embodiments, contextual information related to a given option and/or distribution may additionally or alternatively be viewed in a separate window/data pane of the interface.

Figure 1D:
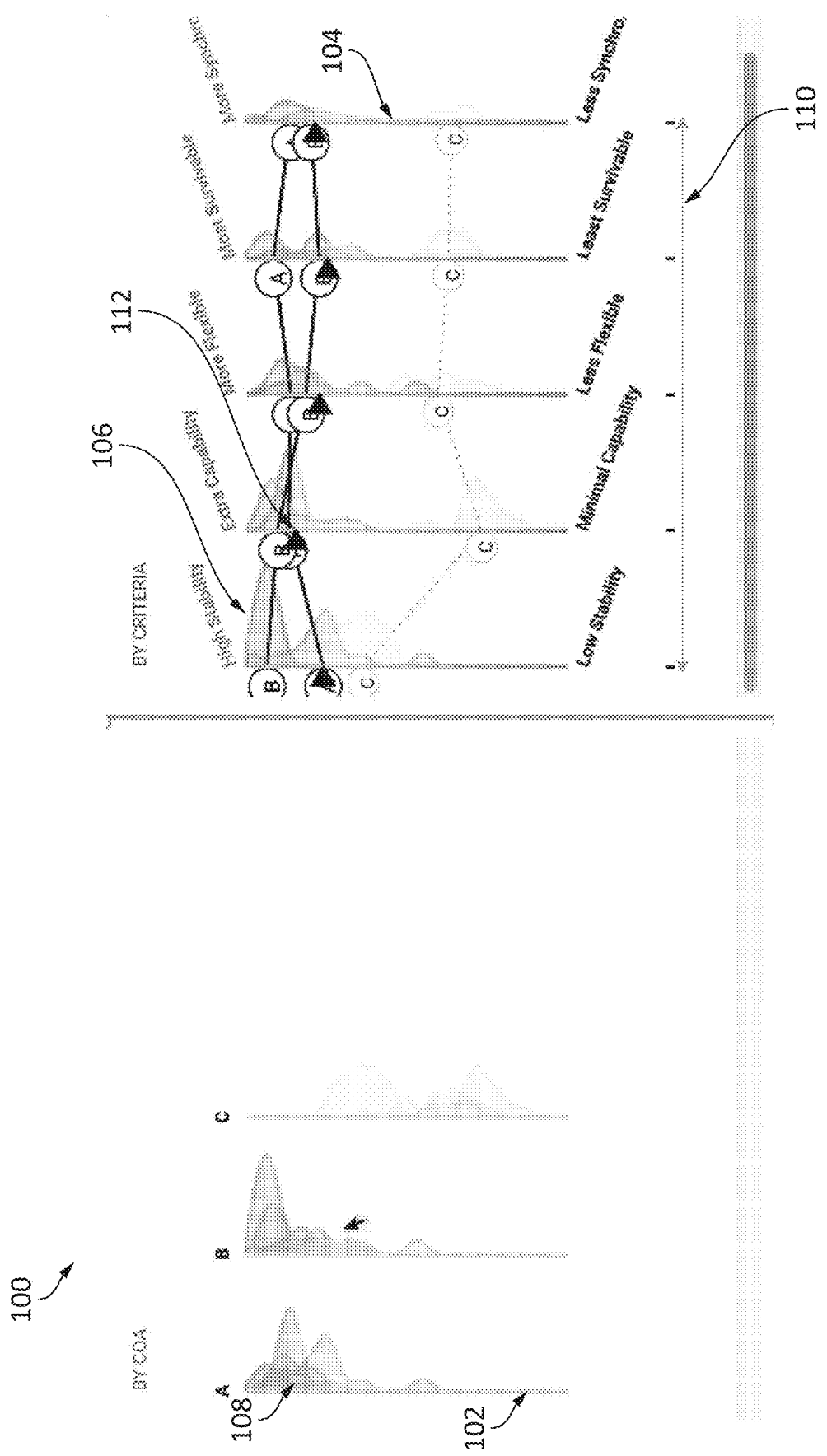

FIG. 1D illustrates an alternate order of evaluation criteria graphs 104 in comparison to FIGS. 1B-1C, wherein the example criteria stability and capability are sorted as more important than flexibility, survivability, and synchronicity. In some embodiments, a user may change the rank of evaluation criteria in the right data pane by selecting one or more criteria graphs 104 and moving it to a different location along the importance scale 110. For example, the user may click on a feature of one or more graphs 104, drag the one or more graphs 104 to a new location in the rank of criteria, and drop the one or more locations in the rank. Graphs 104 may be visually ordered from left-to-right or top-to-bottom by decreasing importance. In some embodiments, the user may manually enter a desired rank of one or more criteria to the user interface 100, and the position of the one or more criteria on the user interface may update accordingly. For example, in the instance evaluation criteria exist in the multi-criteria option comparison tool, the user may manually assign each criteria a rank from 1-5, wherein each ranking is applied to a single criteria. In some embodiments, the decision maker may input a nominal value indicative of the importance (or other attribute used to visually order the criteria), the nominal value corresponding to a value on the scale. For example, in the instance 5 evaluation criteria exist in the model, there may exist 10 possible importance values on a scale, wherein each of the 5 criteria are assigned a value 1-10. The position of one or more graphs 104 in the user interface 100 may update accordingly based on the newly-assigned importance values.

With reference to FIG. 1D, by modifying the rank of the criteria graphs 104, including increasing the importance of stability and capability as shown, the visual weights of the distributions 106 and 108 associated with the criteria stability and capability proportionally may adjust (i.e., increase) automatically. Likewise, the visual weight applied to the distributions associated with the remaining criteria (whose rank were lowered) may automatically decrease. As shown, by modifying the importance of evaluation criteria, a better option may be presented in the left data pane due to the contribution of the visual weights. For example, the decision maker may conclude that in accordance with at least the selected rank of criteria and their respective thresholds of satisfaction, option B is now a more suitable option than A by visualizing the distributions 106 and/or 108.

Figure 1E:
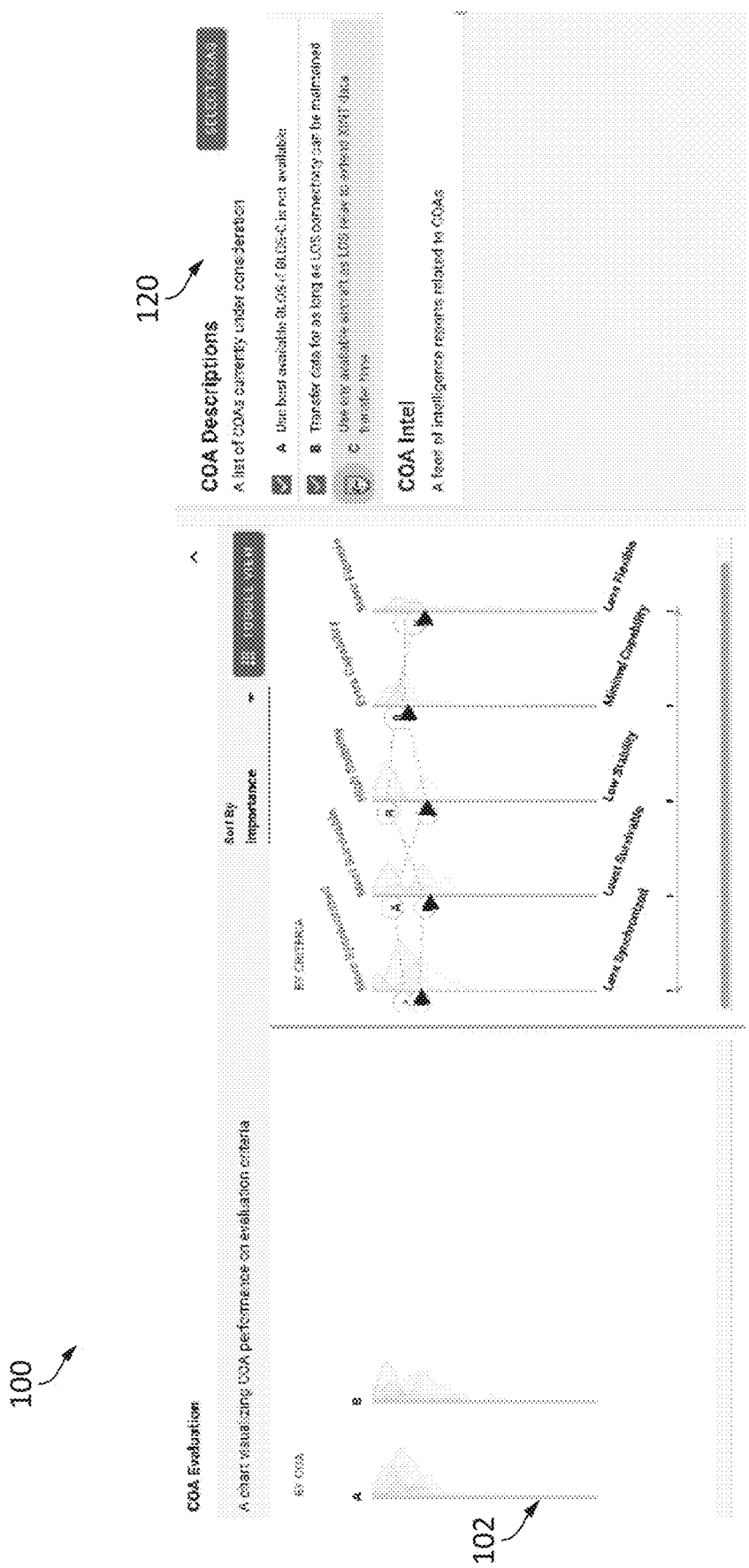

In some embodiments, a decision maker may desire to remove one or more options and/or evaluation criteria completely from the multi-criteria option comparison visualization tool display. As shown in FIGS. 1A-1D, the user may observe one or more options, such as option C in user interfaces 100, which does not perform acceptably with the predefined evaluation criteria and perceived satisfaction thresholds. Thus, as illustrated in FIG. 1E, the decision maker may select the one or more options they wish to remove from the visualization tool in a separate data pane 120 which lists each option. In some embodiments, data pane 120 may additionally provide information related to the plurality of options (e.g., one or more intelligence reports in the military example). In some embodiments, a user may select one or more option graphs 102 and remove the graph from the display by selecting a button on the display. Likewise, in some embodiments, a user may desire to remove one or more criteria from analysis, and may do so in a similar fashion as described with respect to options and option graphs 102. By removing one or more undesirable options and/or unwanted criteria, the user interface 100 may be decluttered and easier examination of the remaining options based on the remaining criteria may be promoted.

Figure 1F:
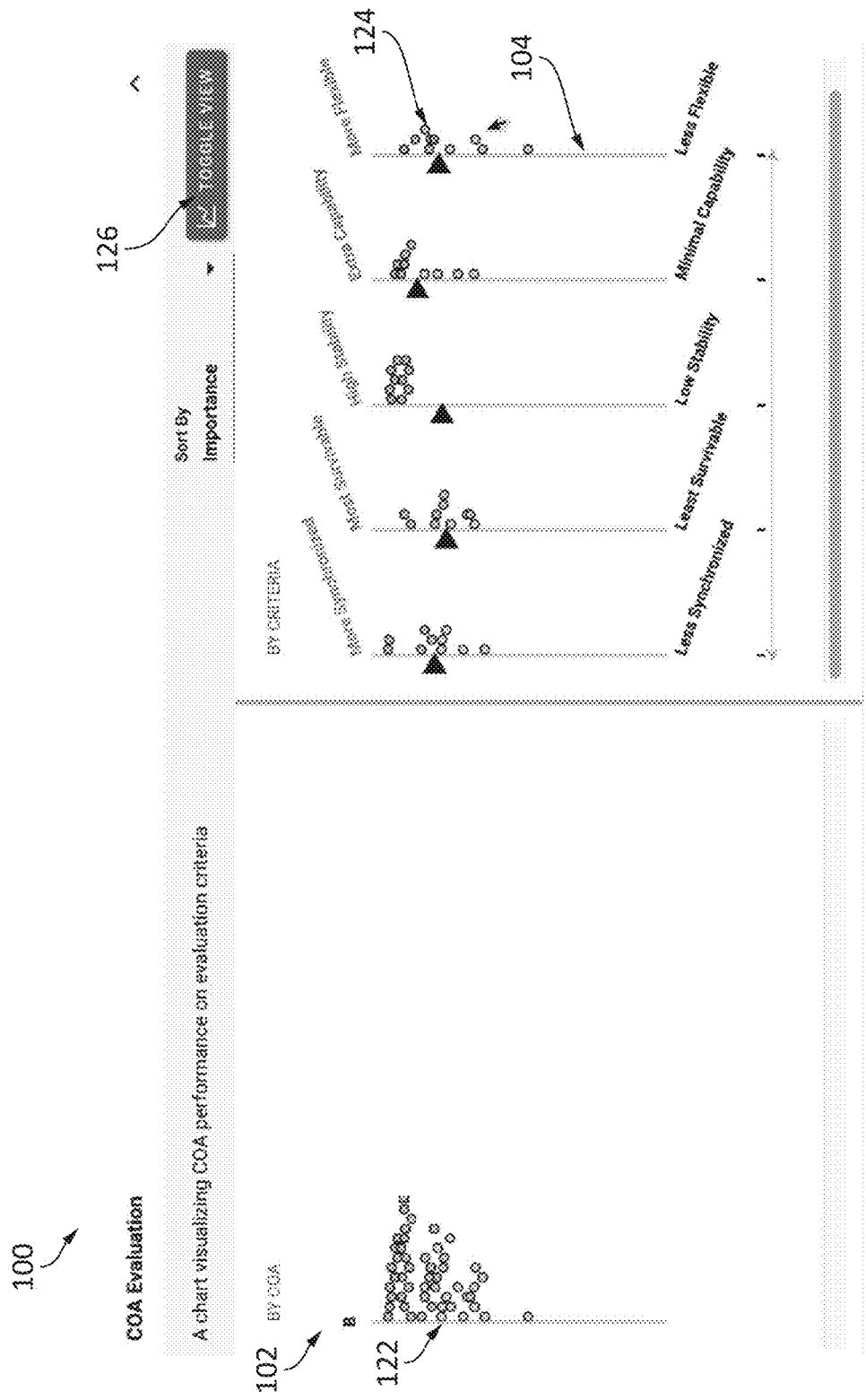

In some embodiments, a decision maker may be interested in one or more individual outcomes which contributes to a given distribution 106 and/or 108. The visualization tool may allow a user to toggle between viewing the data as frequency distributions, as shown in FIGS. 1A-1E, or as data points 122 and 124, as illustrated in FIG. 1F, using a button 126. In some embodiments, a user may toggle between viewing high-level densities and low-level data points by, for instance, clicking more than once on a given graph (e.g., double-clicking with a user input device). For example, data may be illustrated in the form of beeswarm, packed circle, and/or jitter plots.

With reference to the above provided applications of the multi-criteria option comparison model, data points may represent historical case-based data and/or potential future outcomes that contribute to each option being evaluated. For example, in the instance a plurality of options are solutions for solving a problem (e.g., alternative water treatment technologies), the individual data points contributing to each option may be individual solutions that are grouped into a larger option category. For example, a potential solution for water treatment may be the use of chemical treatment, and individual data points may represent different types and/or combinations of chemicals that may be applied to treat the water. Similarly, in another embodiment where the options being evaluated includes plans of actions to achieve an objective, such as military courses of action, the individual data points may comprise distinct instances in which a given course of action was taken in the past. The data points for military courses of action may also represent (additionally or in place of historic case-based data) a more detailed course of action which resides within a broader course of action category. Likewise, in the instance the different options for evaluation are different levels of response to an emergency, data points can comprise historical case-based data and/or different types/combinations of response that may be grouped within a given level of response to the emergency.

Using a data point framing, a decision maker may analyze individual outcomes which make up a given distribution. In some embodiments, by selecting a data point on the beeswarm plot, the visualization tool may display a tooltip (e.g., tooltip 118 in FIGS. 1B-1C), which provides additional information on the selected potential outcome. In some embodiments, in the instance more than one mode exists in a given distribution, a decision maker may determine the cause of each mode by observing individual outcome performance on each criteria and the circumstances driving each individual outcome in a tooltip. For example, in the instance a user selects a data point on a criteria graph 104, tooltip 118 may provide the performance of a potential outcome in the form of a normalized value/score related to the given criteria. In some embodiments, tooltip 118 may provide additional details related to the individual outcome.

In some embodiments, individual data points on criteria graphs 104 and/or option graphs 102 may be colored to illustrate acceptable versus unacceptable options, similar to the coloring of distributions 106 and 108 described above with respect to FIG. 1A. In some embodiments, in toggling to an individual data point view on the display, one or more data points may be selectively highlighted. For example, one or more individual data points which satisfy each of the desired evaluation criteria and satisfaction thresholds perceived by the user may be highlighted on a given criteria graph 104 and/or option graph 102. Thus, if a user is interested in a specific outcome contributing to a distribution, the highlighting may serve as a visual cue for the user to view additional information in tooltip 118 for the highlighted outcomes. In some embodiments, additional individual data points which do not meet the criteria and/or satisfaction thresholds may be receded from the user's view, similar to the distribution shading described above with respect to FIG. 1B.

Observing data on an individual data point framing may allow the decision maker to consider one or more options with regards to specific examples, as opposed to on a high-level with frequency distributions, therefore providing concrete outcomes. Each of the individual data point framing and frequency distribution framing may provide meaningful contributions in aiding the decision maker in selecting one or more suitable options based on multiple criteria.

Figure 2:
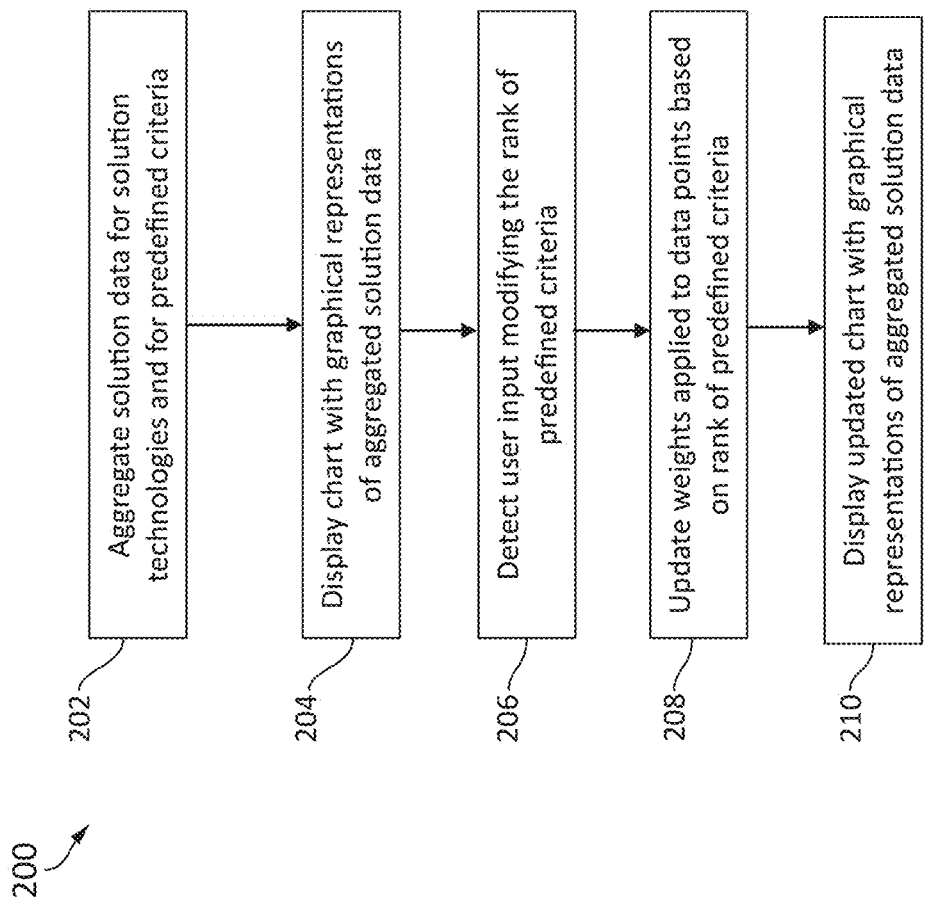
FIG. 2 illustrates a block diagram for using a multi-criteria option comparison tool, in accordance with some embodiments.

FIG. 2 illustrates process diagram 200 for displaying a user modifiable chart comprising a plurality of graphical representations of aggregated option evaluation data, in accordance with some embodiments. At step 202, the system may aggregate data related to potential options from a plurality of sources. The evaluation data may be aggregated for multiple options and for multiple predefined evaluation criteria. For example, the user modifiable chart may be applied to evaluate different plans of action to achieve an objective. In some embodiments, the plurality of options may include different military courses of action. The evaluation criteria associated with the different military courses of action may comprise factors such as survivability, capacity, flexibility, and synchronization, for example.

At step 204, the aggregated data may be displayed in a plurality of graphical representations in a user modifiable chart. Each graphical representation may depict a plurality of data points from one or more data sources, wherein the data points are plotted along vertical or horizontal axes in the graphical representations with a visual weight. The data points may be illustrated in groups of distributions, wherein the distributions on the graphical representations of the predefined criteria may be grouped by option, and the distributions on the graphical representations of the options may be grouped by criteria. The graphical representations associated with the predefined criteria may be visually ordered in the chart based on a rank assigned to each criteria, and the applied weight may be based on the rank of the predefined criteria.

At step 206, the system may detect a user input modifying the rank of one or more predefined criteria, and in accordance with the input, at step 208 the weight applied to each data point may be automatically updated. Additionally, the visual order of the predefined criteria may be updated based on the user input. In some embodiments, the system may detect an additional user input modifying the satisfaction threshold of at least one graphical representation associated with the predefined criteria. In accordance with the additional user input, the location of a marker and a colored shading on the graphical representation may be automatically updated. Modifying the satisfaction threshold may occur prior to, concurrently with, or after modifying the rank of one or more predefined criteria. In some embodiments, a user may not modify the rank of predefined criteria, but may modify one or more satisfaction thresholds. In some embodiments, a user may not modify the one or more satisfaction thresholds, but may modify the rank of predefined criteria.

At step 210, the system may display an updated user modifiable chart comprising the graphical representations of the aggregated option evaluation data. In some embodiments, the graphical representations may be viewable on a high-level distribution format or on a low-level individual data point format. In some embodiments, the updated user modifiable chart may comprise an updated marker and color shading on the plurality of graphical representations.

Figure 3:
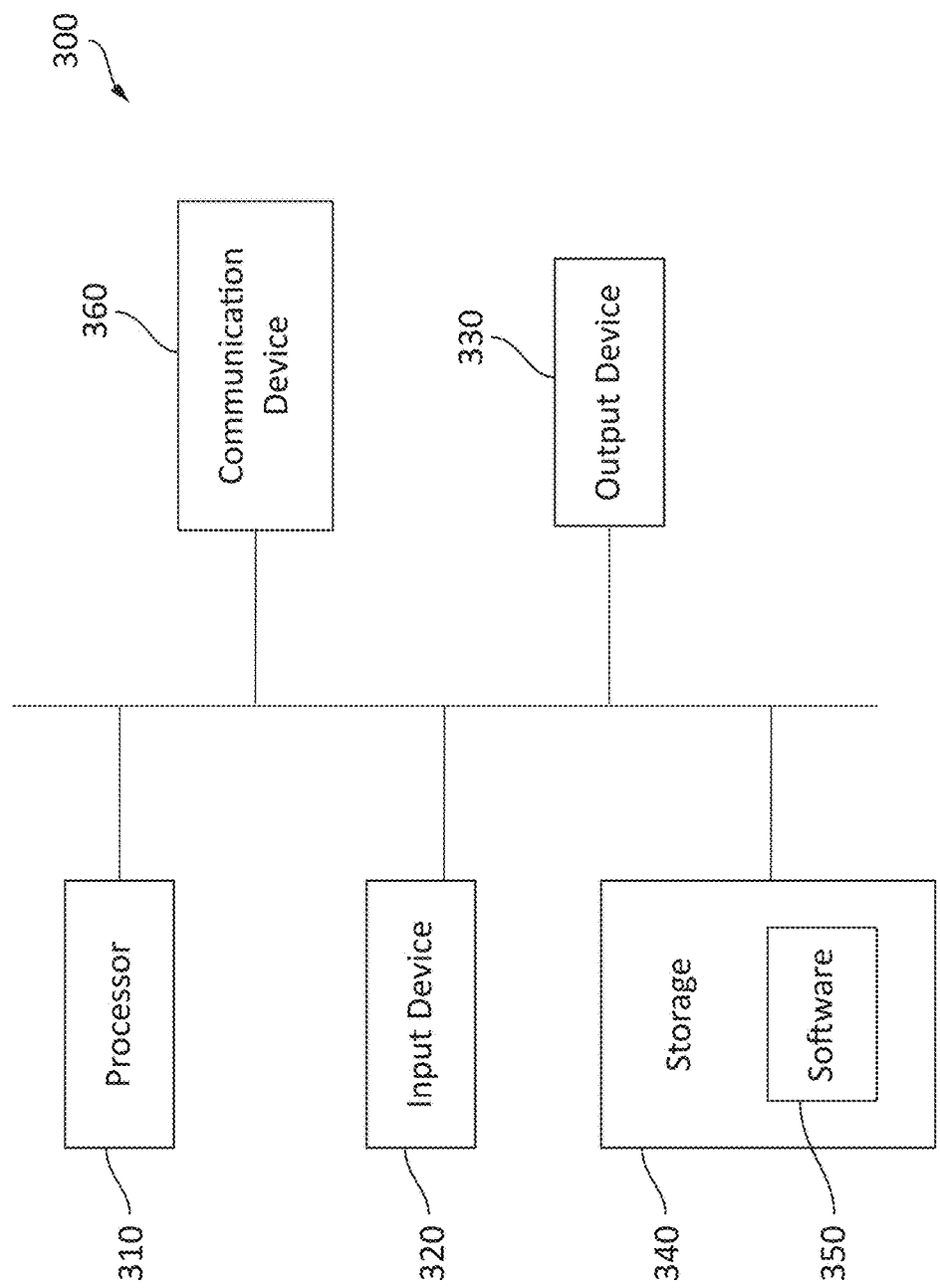
FIG. 3 illustrates an electronic device for use in interacting with a multi-criteria option comparison tool, in accordance with some embodiments.

FIG. 3 illustrates an example of a computing system 300, in accordance with some examples of the disclosure. System 300 can be a client or a server. As shown in FIG. 3, system 300 can be any suitable type of processor-based system, such as a personal computer, workstation, server, handheld computing device (portable electronic device) such as a phone or tablet, or dedicated device. The system 300 can include, for example, one or more of input device 320, output device 330, one or more processors 310, storage 340, and communication device 360. Input device 320 and output device 330 can generally correspond to those described above and can either be connectable or integrated with the computer.

Input device 320 can be any suitable device that provides input, such as a touch screen, keyboard or keypad, mouse, gesture recognition component of a virtual/augmented reality system, or voice-recognition device. Output device 330 can be or include any suitable device that provides output, such as a display, touch screen, haptics device, virtual/augmented reality display, or speaker.

Storage 340 can be any suitable device that provides storage, such as an electrical, magnetic, or optical memory including a RAM, cache, hard drive, removable storage disk, or other non-transitory computer readable medium. Communication device 360 can include any suitable device capable of transmitting and receiving signals over a network, such as a network interface chip or device. The components of the computing system 300 can be connected in any suitable manner, such as via a physical bus or wirelessly.

Processor(s) 310 can be any suitable processor or combination of processors, including any of, or any combination of, a central processing unit (CPU), field programmable gate array (FPGA), and application-specific integrated circuit (ASIC). Software 350, which can be stored in storage 340 and executed by one or more processors 310, can include, for example, the programming that embodies the functionality or portions of the functionality of the present disclosure (e.g., as embodied in the devices as described above).

Software 350 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 340, that can contain or store programming for use by or in connection with an instruction execution system, apparatus, or device.

Software 350 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 300 can implement any operating system suitable for operating on the network. Software 350 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A computer-implemented method for displaying a user modifiable chart comprising a plurality of graphical representations of aggregated option evaluation data, the method comprising:
   aggregating option evaluation data for a plurality of options and for a plurality of predefined criteria;
   graphically displaying the user modifiable chart comprising the plurality of graphical representations of the aggregated option evaluation data, wherein:
      each graphical representation depicts a graph comprising data points visually plotted with weights,
      the plurality of graphical representations for the plurality of predefined criteria are visually ordered according to a rank of the plurality of predefined criteria, and
      the weights are based on the rank of the plurality of predefined criteria;
   detecting a first user input modifying the rank of at least one predefined criterion;

in accordance with the first user input, automatically updating the weights of the data points; and displaying an updated user modifiable chart comprising the plurality of graphical representations of the aggregated option evaluation data.

2. The method of claim 1, including, in accordance with the first user input, automatically updating the visual order of the plurality of graphical representations for the plurality of predefined criteria.

3. The method of claim 2, including displaying the updated user modifiable chart comprising the updated visual order of the plurality of graphical representations for the plurality of predefined criteria.

4. The method of claim 1, wherein each graphical representation for the plurality of predefined criteria comprises a user modifiable satisfaction threshold.

5. The method of claim 4, wherein the user modifiable satisfaction thresholds distinguish between more desirable and less desirable plotted data points.

6. The method of claim 4, including detecting a second user input modifying the satisfaction threshold of at least one graphical representation.

7. The method of claim 6, including, in accordance with the second user input, automatically updating a location of a marker and a colored shading on the plurality of graphical representations.

8. The method of claim 7, including displaying the updated user modifiable chart comprising the updated marker and the updated colored shading on the plurality of graphical representations.

9. The method of claim 7, wherein the colored shading in a first direction from the marker is a first color, and the colored shading in a second direction from the marker is a second color.

10. The method of claim 1, wherein the user modifiable chart is utilized to evaluate a plurality of plans of action to achieve an objective.

11. The method of claim 10, wherein the plurality of options includes alternative military courses of action.

12. The method of claim 11, wherein the plurality of predefined criteria for evaluating the military courses of action includes survivability, capacity, flexibility, and synchronization.

13. The method of claim 1, wherein each graphical representation depicts the data points in one or more frequency distributions on a vertical axis.

14. The method of claim 1, wherein a data point represents an individual outcome contributing to one or more options being evaluated.

15. The method of claim 14, wherein a location of the data point on a graphical representation of the aggregated option evaluation data is based on performance of the individual outcome.

16. The method of claim 15, wherein a first direction of the plurality of graphical representations depicts better performance, and a second direction of the plurality of graphical representations depicts worse performance.

17. The method of claim 15, wherein the performance is normalized for comparing the plurality of options based the plurality of predefined criteria.

18. The method of claim 1, wherein a first graphical representation of the aggregated option evaluation data comprises a first set of data points related to a first option.

19. The method of claim 18, wherein a second graphical representation of the aggregated option evaluation data comprises a second set of data points evaluated based on a first predefined criterion.

20. The method of claim 19, wherein a portion of the second set of data points overlaps with the first set of data points.

21. The method of claim 1, wherein a format of the plurality of graphical representations is interchangeable between frequency distributions and individual data points based on user selection.

22. A system for displaying a user modifiable chart comprising a plurality of graphical representations of aggregated option evaluation data, the system comprising:
a display; and
one or more processors configured to cause the system to:
aggregate option evaluation data for a plurality of options and for a plurality of predefined criteria;
graphically display the user modifiable chart comprising the plurality of graphical representations of the aggregated option evaluation data, wherein:
each graphical representation depicts a graph comprising data points visually plotted with weights,
the plurality of graphical representations for the plurality of predefined criteria are visually ordered according to a rank of the plurality of predefined criteria, and
the weights are based on the rank of the plurality of predefined criteria; detect a first user input modifying the rank of at least one predefined criterion;
in accordance with the first user input, automatically update the weights of the data points; and
display an updated user modifiable chart comprising the plurality of graphical representations of the aggregated option evaluation data.

23. A non-transitory computer-readable storage medium storing instructions for displaying a user modifiable chart comprising a plurality of graphical representations of aggregated option evaluation data, the instructions executable by a system, the system comprising a display and one or more processors, wherein execution of the instructions by the system causes the system to:
aggregate option evaluation data for a plurality of options and for a plurality of predefined criteria;
graphically display the user modifiable chart comprising the plurality of graphical representations of the aggregated option evaluation data, wherein:
each graphical representation depicts a graph comprising data points visually plotted with weights,
the plurality of graphical representations for the plurality of predefined criteria are visually ordered according to a rank of the plurality of predefined criteria, and
the weights are based on the rank of the plurality of predefined criteria;
detect a first user input modifying the rank of at least one predefined criterion;
in accordance with the first user input, automatically update the weights of the data points; and
display an updated user modifiable chart comprising the plurality of graphical representations of the aggregated option evaluation data.

* * * * *